(No Model.) 3 Sheets—Sheet 1.
A. J. KEMP.
SEED PLANTER AND FERTILIZER DISTRIBUTER.
No. 496,362. Patented Apr. 25, 1893.
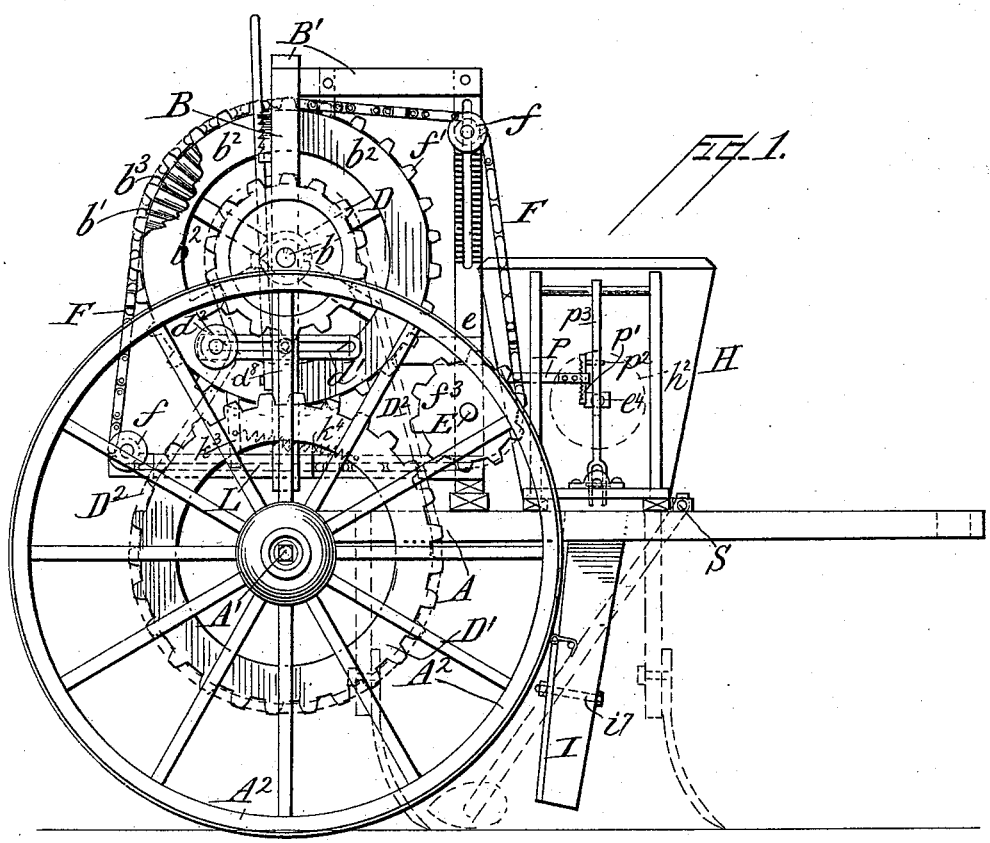

(No Model.) 3 Sheets—Sheet 2.
A. J. KEMP.
SEED PLANTER AND FERTILIZER DISTRIBUTER.
No. 496,362. Patented Apr. 25, 1893.
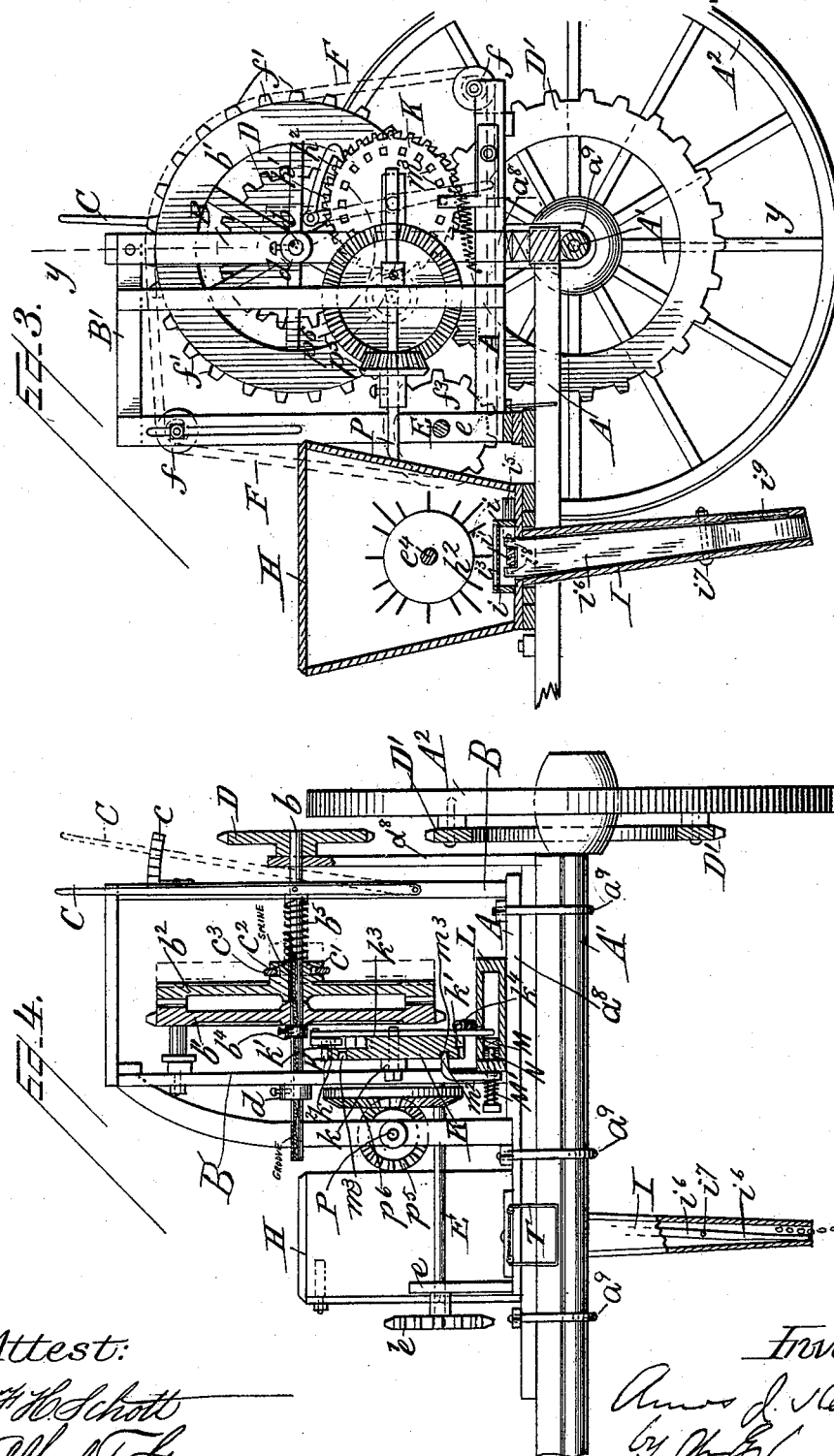

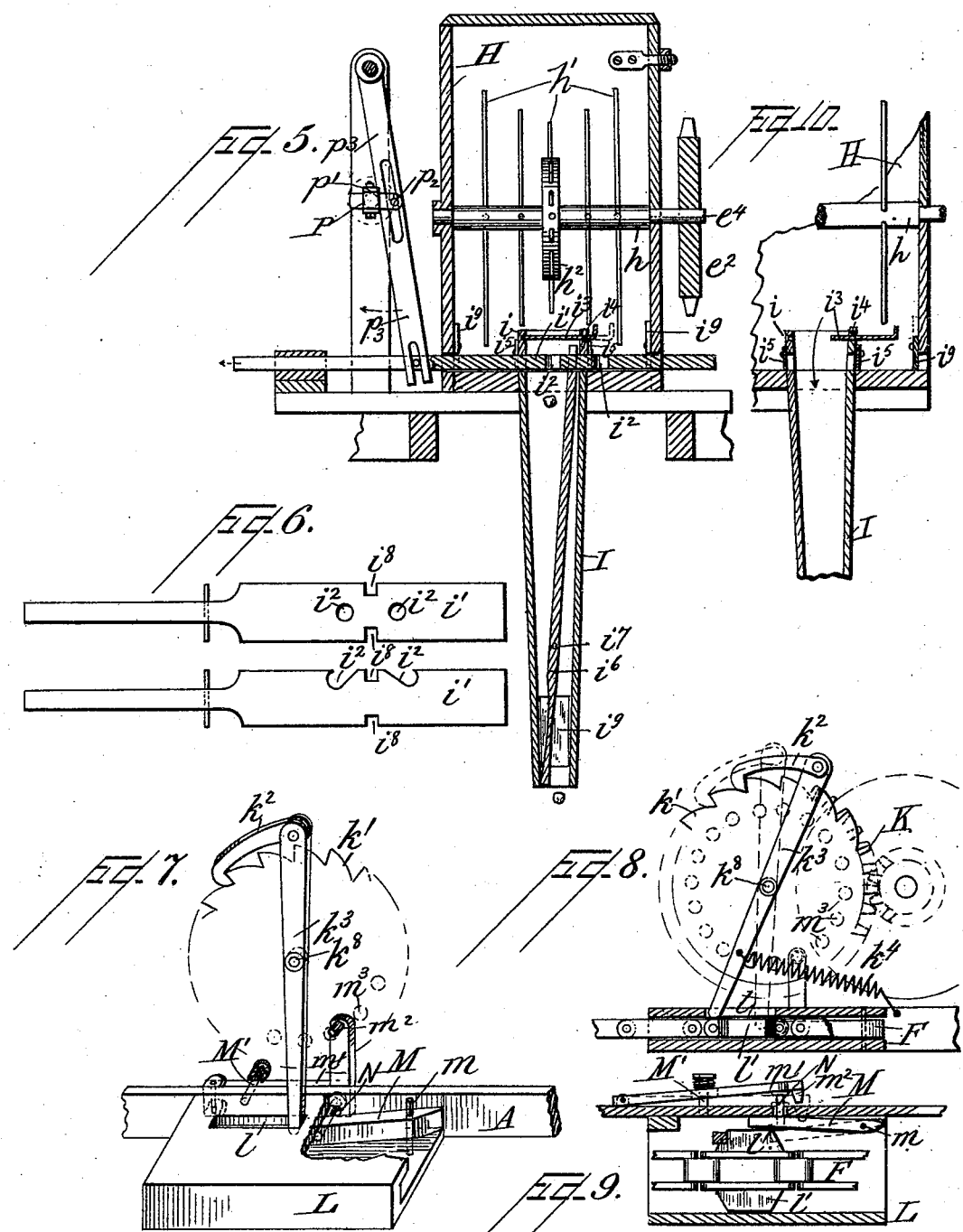

United States Patent Office.

AMOS JOHN KEMP, OF MANSFIELD, TEXAS, ASSIGNOR OF ONE-HALF TO CAP BRATTON, OF SAME PLACE.

SEED-PLANTER AND FERTILIZER-DISTRIBUTER.

SPECIFICATION forming part of Letters Patent No. 496,362, dated April 25, 1893.

Application filed August 3, 1892. Serial No. 442,046. (No model.)

*To all whom it may concern:*

Be it known that I, AMOS JOHN KEMP, a citizen of the United States, residing at Mansfield, in the county of Tarrant and State of Texas, have invented certain new and useful Improvements in Seed-Planters and Fertilizer-Distributers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in planters or fertilizer distributers, and has for its object the construction of such a device as can be readily and easily adapted to planting seed in drills or check rows, or to distributing fertilizer and in which the operator can always tell where the last hill was planted so that he will know where to commence his next row.

The invention consists in the novel combination and arrangement of parts, such as will be hereinafter described, pointed out in the appended claims and illustrated in the accompanying drawings.

In the accompanying drawings in which similar letters of reference designate corresponding parts, Figure 1 is a side elevation of a planter embodying the invention. Fig. 2 is a plan view of the same. Fig. 3 is a longitudinal vertical section on the line $x$—$x$ of Fig. 2. Fig. 4 is a detail view showing a section on the line $y$—$y$ of Fig. 3. Fig. 5 is a detail view, showing a section through the hopper and several of its adjunctive parts. Fig. 6 is a detail view showing a plan view of the different slides. Fig. 7 is a detail showing a perspective view of the guide which carries the sprocket chain at the point where it operates the lever to move the intermittently rotated gear and the spring catch. Fig. 8 is a detail view, showing the same, the guide being in section and the chain in engagement with the lever. Fig. 9 is a detail view, showing a horizontal section through the guide. Fig. 10 is a detail view, showing the upper portion of the depositing spout with the slide removed.

Referring to the drawings, A designates the main frame of the machine, supported in a horizontal position upon the axle $A'$ carried by the wheels $A^3$ and $A^2$.

B and $B'$ are supplementary frame bars suitably secured in an upright position on the main frame. The main frame A consists essentially of the sill $a^8$ and of the side and cross pieces connected with the same. It is adjustably secured on the frame of a cultivator by means of the collars or straps $a^9$ $a^9$ passing around the sill and the axle $A'$ and its bed. By means of this construction the frame may be adjusted transversely of the machine, thereby allowing it to be secured to machines of various constructions and dimensions. In the frame bars B $B'$ and the standard $d^8$ is suitably journaled the horizontal shaft $b$, which carries a clutch composed of two wheels $b'$ and $b^2$, having on the inner faces radial teeth $b^3$ $b^3$ adapted to engage with each other. The wheels are of considerable diameter so that there will be a considerable number of teeth registering with each other when in engagement. The wheel $b'$ is loosely mounted upon the shaft so as to allow the shaft $b$ to be freely rotated without necessarily carrying the said wheel with it. Its lateral movement is limited by the collar $b^4$. The wheel $b^2$ is splined upon the shaft $b$ and is necessarily turned by the rotation of the latter and it has a free lateral movement thereon. Around the shaft $b$, between the wheels $b^2$ and a side of the frame B, the spiral spring $b^5$ is mounted, the purpose of which is to press the wheel $b^2$ in engagement with the wheel $b'$.

C designates a lever pivoted at its lower end to the frame bar B and provided at its upper end with a catch adapted to engage with the toothed segment $c$ so that the lever can be secured in any desired adjustment. In the hub $c'$ of the wheel $b^2$ an annular groove $c^2$ is formed in which the collar $c^3$ is seated and is attached to the lever C by means of the link $c^4$, the inner end of the latter being bifurcated so that the proper connection with the collar can be made. The object of the lever and its connections is to provide a means for moving the wheel $b^2$ in or out of engagement with the wheel $b'$.

D designates a sprocket wheel mounted on a projecting end of the shaft $b$ and it is connected with the sprocket wheel D′ suitably mounted on the wheel $A^2$ by the sprocket chain $D^2$ as shown in dotted lines in Fig. 1. Through this mechanism the drive wheel $A^2$, the sprocket wheels D and D′, the sprocket chain $D^2$ and the shaft $b$, the several operative parts of the machine are driven. The sprocket wheel D is firmly secured on the end of the shaft $b$ and together with collar $d$ provided with a suitable set screw prevents the shaft $b$ from moving laterally. To take up any slack that may be in the sprocket chain $D^2$, and thereby prevent the loss of motion as much as possible, the adjustable arm $d'$ is provided, which is attached to the standard $d^3$ secured to the axle bed independent of the frame and carries on its outer end the pulley $d^2$ which bears against the sprocket chain for the purpose above specified.

F designates a sprocket chain carried in part by the idlers $f\,f$, journaled upon suitable bearings attached to the frame B′, the wheel $b'$ the periphery of which is provided with suitable teeth $f''\,f''$ and the sprocket wheel $f^3$ mounted on the inner end of the shaft E that is journaled in the standards $e\,e$. One of the idlers $f$ is adjustably attached to the frame so that any slack in the chain can be taken up for obvious purposes. On the outer end of the shaft E is mounted the sprocket wheel $e'$ which is connected by means of the sprocket chain $e^3$ with the sprocket wheel $e^2$ mounted on a projecting end of the shaft $e^4$ journaled in the sides of the hopper H. The shaft passes through the hopper centrally and carries within the same, a sleeve $h$ secured to the shaft so as to be rotatable therewith to which the stirrers $h'$ are attached. On this sleeve $h$ is mounted a disk $h^2$, midway between the sides of the hopper and directly over the opening in the bottom of the latter. From the periphery of the disk additional stirrers extend. Through these stirrers and the mechanism carrying and driving them the seed or fertilizer carried within the hopper is prevented from caking or packing and a perfect supply of seed or fertilizer to the opening in the bottom of the hopper is insured.

In the bottom of the hopper H an opening is formed from which the spout I leads and it is in such a position as to deposit the seed or fertilizer back of the plow for opening the ground to receive the latter. Surrounding the opening in the bottom of the hopper is a casing $i$, the sides of which are slotted opposite to each other. In the slots a reciprocating slide $i'$ is seated and is provided with vertical openings or cups $i^2\,i^2$. The distance that the slide moves and the distance that the two openings or cups are apart, is such, that at the end of a stroke, either backward or forward one of the openings or cups will be directly over the spout to empty itself and the other outside of the casing in a position to be filled by the material in the hopper. The casing $i$ is provided at its upper end with a slide or cut off $i^3$ which fits in grooves formed in the inner faces of the casing. The object of this slide or cut-off is to regulate the supply of seed or fertilizer to the spout when it is desired to drill in the seed or fertilizer and not to deposit it intermittently. The slide can be so adjusted as to present an opening of almost any desired size that may be required and is provided with a screw $i^4$ to hold it in its adjusted position. In case it is desired to use the machine as a drill, the slide $i$ is removed and the openings in the sides of the casing are closed by the pivoted plates $i^5$, $i^5$. The supply of seed to the spout is regulated by the cut-off $i^3$. It will be necessary also to remove the flirt valve $i^6$. When it is desired to deposit the seed or fertilizer in check rows, either of the forms of slide $i$ as shown in Fig. 6 can be used. The slide with the circular cups formed through it, is the preferable form for depositing fertilizer, while that in which the cups are formed in the edge of the plate is the preferable form for the seed. The spout I is provided with a flirt valve $i^6$ which is pivoted at $i^7$ to the spout and has its upper end bifurcated and engaged with the slide $i'$, the latter being suitably recessed at $i^8$, $i^8$ for the purpose. Any movement of the slide will be communicated to the flirt valve which will prevent the seed or fertilizer from clogging in the spout. In a side of the spout, near its lower end, a glass window $i^9$ is inserted to allow an inspection of the interior of the spout to be made.

The means for reciprocating the slide $i'$ will now be described.

K designates a gear wheel journaled on a bearing $k^5$ carried by the support $k$ and has formed on its inner side a ratchet $k'$ with which the pawl $k^2$ carried by the lever $k^3$ is adapted to engage. The lever $k^3$ is pivoted on the same bearing that supports the gear wheel K and will when moved backward, at its lower end, through the pawl and ratchet mechanism $k^2$ and $k'$, rotate the said gear to a considerable distance. When the lever is released by the mechanism that moves its lower end backward, it will be returned to its normal position by the spiral spring $k^4$.

L designates a trough or guide (see Figs. 4, 7, 8 and 9) placed beneath the wheels $b'$ and $b^2$ and the gear wheel K and through which the sprocket chain F moves. This guide or trough is provided with a vertical slot $l$ in its upper side through which the lever $k^3$ projects. At intervals along the chain F, cams or dogs $l'$ are secured, of which, those on one side are adapted to engage with the lower end of the lever $k^3$, and to carry the said end backward until it is disengaged thereby, through the mechanism already described, partly rotating the gear-wheel K. In the guide or trough near the side under the gear wheel K, a lever M is pivoted at $m$ and has one of its inner faces beveled. On the outside of the trough or guide, an arm $m'$ is hinged at one end and midway between its ends, it is slotted for the passage of the bolt M', around which between its head and the hinged arm, a coil spring is wound and serves to press the arm toward the guide. To the inside of the outer hinged arm, a catch $m^2$ is attached, and is adapted to engage with the gear wheel K, which is provided with recesses $m^3$ for the purpose. The object of the spring catch is to retain the gear wheel in a fixed position while it is not being moved by the lever $k^3$.

N designates a pin movably seated in the side of the guide with its ends respectively contacting with the lever M and the hinged arm $m'$. The cams or dogs $l'$ will on entering the guide or trough first engage with the beveled face of the lever M, and press it against the side of the guide. This movement of the said lever, will, through the pin N disengage the spring catch $m^2$ from the gear wheel K. The dogs or cams shortly after contacting with the lever M will engage with the lever $k^3$ and carry the lower end of the latter forward and at the same time press upon the lever M during the movement of the lever $k^3$. The length of the levers is such that they will both be released at the same time. The cams or dogs on the opposite side of the chain serve to act as guides and to keep the chain in its proper path within the trough or guide L.

P designates a horizontal shaft journaled in suitable portions of the frame work, and has adjustably attached to its front end the crank $p'$, the projecting pin $p^2$ of which registers with a slot formed in the arm $p^3$ hinged at its upper end to a suitable part of the frame work. This hinged arm is connected with the slide $i'$. The shaft P is intermittently rotated, and will through its crank connection reciprocate the slide $i^3$, the amount being adjusted by the adjustment of the crank $p'$. On the shaft P is mounted the bevel gear $p^5$ which engages with a similar gear $p^6$ mounted on the outer end of the arbor $p^7$ which is journaled in suitable bearings formed in the frame. On the inner end of this arbor is mounted a gear wheel $p^8$ that meshes with the gear wheel K. By these connections, the intermittent motion given by the gear wheel K is transmitted to the shaft P and by it to reciprocate the slide $i^3$, the relative proportions of the different parts being such that each movement of the lever $k^3$ will rotate the shaft P half way.

S S designate arms secured to the frame work in front of the hopper and are adapted to have markers of any suitable construction secured to their outer ends. Back of the hopper a guide T is hinged, by means of which, at the end of each row, a stake can be driven through the guide to indicate the last planting and on turning the planter around, serves as a guide to the beginning of the next row.

The operation of the device is as follows: The hopper is filled with the seed or fertilizer and if it is intended to deposit it in check-rows, the slides are inserted in the bottom of the hopper. The machine is started, and by means of the lever C and the intermediate connections, the wheels $b'$ and $b^2$ are brought into engagement through the connecting mechanism, and the slides $i^3$ will be reciprocated and deposit the seed or fertilizer in the furrow formed for its reception. The frequency with which the slide will operate can be regulated by the number of cams carried by the sprocket chain F, the chain being so made as to allow the insertion of the desired number. When the operator has reached the end of a row, to mark the last planting or hill, he will drive a stake through the loop or guide T and will then turn the machine and bring the planter into such a position that one of the markers S S will touch the stake.

Having described my invention, what I claim, and desire to secure by Letters Patent, is—

1. In a planter or fertilizer distributer, the combination of the hopper, the reciprocating slide mounted in the bottom of the said hopper, the swinging arm connected at its free end with the said slide the rotatable shaft, the adjustable crank connecting the said arm with the shaft, the bevel gear mounted on the said shaft, the arbor journaled in the frame of the machine, the bevel gear mounted on the outer end of the said arbor and meshing with the first mentioned bevel gear, the intermittently rotated gear-wheel, and the gear mounted on the inner end of the said arbor and meshing with the gear wheel K, substantially as described.

2. In a planter and a fertilizer distributer, the combination of the hopper, the reciprocating slide mounted in the bottom thereof, the gear wheel connected with the said slide by intermediate gears and shafting, the lever connected with the said gear by a pawl and ratchet mechanism, the driving shaft, the clutch mounted thereon, one of the members of the clutch having sprocket teeth projecting from its periphery, and the sprocket chain driven by the said member having dogs or cams to intermittently engage with the said lever, substantially as described.

3. In a planter and a fertilizer distributer, the combination of the hopper, the reciprocating slide mounted in the bottom thereof, the intermittently rotated gear wheel having notches on its outer side, the intermediate mechanism connecting the gear wheel with the slide, the intermittently operated lever, the pawl and rack mechanism connecting the said lever and gear-wheel, the mechanism for retaining the said gear wheel while it is not being operated upon by the lever, consisting of a guide trough, the spring pressed arm mounted outside of the trough and provided at its free end with a catch adapted to normally engage with the notches formed in the outer side of the gear wheel, the lever mounted on the inside of the guide and connected with the said arm, and the moving chain provided with cams to operate the spring catch and the lever, substantially as described.

4. In a planter and a fertilizer distributer, the combination of the hopper, the shaft mounted therein, the agitator carried by the said shaft, the horizontal shaft mounted back of the hopper, the sprocket wheels mounted on the ends of the said shaft and the end of the shaft carrying the agitator, the sprocket chain connecting the sprocket wheel on the shaft carrying the agitator with the sprocket wheel on the outer end of the horizontal shaft, the rotatable shaft journaled in the frame of the machine, the clutch mounted thereon, consisting of two wheels having teeth on the adjacent faces, one of said wheels being loosely mounted on the shaft and having sprocket teeth projecting from its periphery and the other wheel splined on the shaft, the lever and the connecting mechanism for bringing the wheels together, and the idler rollers, one of which is adjustably mounted on the frame, and the sprocket chain carried by the said idler rollers and the sprocket wheels carried on the inner end of the first mentioned shaft, and formed of one of the wheels, substantially as described.

5. In a planter or fertilizer distributer, a guide for the purpose specified, consisting of a loop or bail hinged to the frame, substantially as described.

In testimony whereof I affix my signature in presence of two witnesses.

AMOS JOHN KEMP.

Witnesses:
J. H. ALEXANDER,
ABE BRATTON.